United States Patent
Atwater et al.

(10) Patent No.: US 7,708,980 B2
(45) Date of Patent: May 4, 2010

(54) NONFLAMMABLE PROPELLANT BLEND

(75) Inventors: Michael Atwater, Salem, NH (US); Donald R. Williams, Plymouth, MA (US); Frederick P. Walnut, North Attleborough, MA (US); Keith D. Begin, Rockland, MA (US)

(73) Assignee: Illinois Tool Works Inc., Glenview, IL (US)

( * ) Notice: Subject to any disclaimer, the term of this patent is extended or adjusted under 35 U.S.C. 154(b) by 650 days.

(21) Appl. No.: 11/351,888

(22) Filed: Feb. 10, 2006

(65) Prior Publication Data

US 2007/0190093 A1   Aug. 16, 2007

(51) Int. Cl.
*B01F 3/04* (2006.01)
*C09K 3/30* (2006.01)
*A61K 9/12* (2006.01)
*A01N 25/06* (2006.01)
*B65D 83/14* (2006.01)

(52) U.S. Cl. .............................. 424/45; 516/8; 222/635; 252/372; 424/405

(58) Field of Classification Search ........................ None
See application file for complete search history.

(56) References Cited

U.S. PATENT DOCUMENTS

| 4,004,049 | A |   | 1/1977 | Horwat et al. |
| 4,265,797 | A |   | 5/1981 | Suk |
| 4,384,661 | A |   | 5/1983 | Page et al. |
| 4,396,152 | A | * | 8/1983 | Abplanalp ................... 239/337 |
| 4,420,575 | A |   | 12/1983 | Rapaport et al. |
| 4,477,613 | A |   | 10/1984 | Evans et al. |
| 5,280,061 | A |   | 1/1994 | Haraguchi et al. |
| 5,444,112 | A |   | 8/1995 | Carnahan |
| 5,931,354 | A |   | 8/1999 | Braud et al. |
| 6,345,775 | B1 | * | 2/2002 | Purvis et al. ................. 239/337 |
| 6,848,599 | B2 |   | 2/2005 | Hammarth et al. |
| 6,905,084 | B2 |   | 6/2005 | Hammarth et al. |

FOREIGN PATENT DOCUMENTS

EP    0 616 018 B1    6/1997

OTHER PUBLICATIONS

Aerosolv instruction manual, Katec Incorporated, 1998.
Crowley, James D., et al., A Three-Dimensional Approach to Solubility, Journal of Paint Technology, vol. 38, No. 496, pp. 269-280, May 1966.

* cited by examiner

*Primary Examiner*—Yvonne L Eyler
*Assistant Examiner*—Christopher R Lea
(74) *Attorney, Agent, or Firm*—Whyte Hirschboeck Dudek S.C.

(57) ABSTRACT

Propellants comprising a combination of: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material are effective for a wide range of airless applications. Adjustment of the ratios of (a) to (b) to (c) can lead to propellants that provide excellent spray patterns for a wide range of organic chemical-based formulations.

22 Claims, No Drawings

NONFLAMMABLE PROPELLANT BLEND

BACKGROUND OF THE INVENTION

This invention relates to the field of spray or aerosol delivery systems and, in particular, to providing a nonflammable propellant for such system.

Airless canister and aerosol systems offer the advantages of portability, ease of cleaning and convenience over more conventional spray systems. However, strict Department of Transportation (DOT) regulations govern maximum allowable canister shipping pressure so propellants must be used that can both aerosolize the contents into a useful spray pattern and maintain sufficient pressure to deliver the contents until the canister is empty.

Typically, one of the propellant components is a compound that at canister pressure can support both liquid and vapor phases. As the canister is emptied, vapor accompanies the adhesive out of the canister but the vapor is replenished from the liquid phase to maintain the equilibrium. It is more efficient to have most of this component in the liquid phase to conserve volume but this component must be able to vaporize rapidly when the liquid/vapor equilibrium is disturbed by the spraying operation. Low boiling point liquids that are commonly used for this purpose consist of but are not limited to dimethyl ether, liquefied petroleum gas blends such as A-70T, and hydrofluorocarbon and fluorocarbon blends such as Dymel® 152A, Dymel® 134A.

The second propellant component is usually a gas, included to provide a high enough pressure to empty the canister without compromising the spray pattern. Typically, nitrogen, air, $(NO)_x$ or carbon dioxide is used although in theory almost any gas can be substituted. An inert gas is preferred; oxygen, air and $(NO)_x$ can prematurely age certain formulation components, for example.

There is much art to the design of the propellant. The propellant components must be compatible with each other. Moreover, they must interact with the formulation in such a way so as to prevent phase separation of the liquid portion. Finally, some solubility of the propellant in the formulation is desirable so that when the material exits the spray gun, release of the soluble propellant provides the desired breakup of the liquid stream and uniform fan pattern.

Environmental considerations are becoming more and more important in shaping the composition of propellants. Thus, the formulator must consider the impact of using toxic, flammable, volatile organic compounds (VOC) content and hazardous air pollutants (HAPS). Insurance agencies are increasing fire insurance premiums for manufacturers storing flammable substances. Dymel® 152A and Dymel® 134A are the only propellants in the above list that are VOC exempt; of these, only Dymel® 134A is nonflammable. Neither Dymel® 152A nor Dymel® 134A is very compatible with most organic chemical-based formulations. Chlorofluorocarbons have been shown to damage the ozone layer and have been banned by international agreement.

There are very few propellant choices remaining if flammability and VOC issues are to be considered. It is therefore important to develop novel and innovative approaches to identify safe, nonflammable, VOC compliant and effective propellants.

Patent literature teaches the importance of formulation in promoting sprayability of water-based pressure pot systems. In U.S. Pat. No. 4,384,661, Page et al. disclose the use of a high hydrophilic/lipophilic balance ("HLB") value nonionic surfactant to improve paint aerosolization by reducing foaming. Alcohol additives and polymer mixtures are used in U.S. Pat. No. 4,420,575 (Rapaport et al.) and U.S. Pat. No. 4,265,797 (Suk) to improve sprayable paint systems. Evans et al. (U.S. Pat. No. 4,477,613) stabilize an aqueous-based tackifier using a combination of small amounts of a nonionic or anionic surfactant and an elastomeric latex. Horwat et al. (U.S. Pat. No. 4,004,049) improve latex spray adhesion by introducing a controlled instability. In U.S. Pat. No. 5,444,112, Carnahan teaches use of a nonionic neoprene latex to aerosolize a water-based adhesive.

Equipment is also important in providing an even, consistent spray in water-based systems. Hammarth et al. (U.S. Pat. Nos. 6,905,084 and 6,848,599) describe the guns, hoses, canisters and accessories in some detail. In U.S. Pat. No. 5,931,354, Brand et al. claim an application system for sprayable water-based adhesives.

The focus of the present invention is the utility of certain propellant mixtures for both water-based and solvent-based airless canister and aerosol systems. Haraguchi et al. (U.S. Pat. No. 5,280,061) teach that "the solvents and the propellant are required to have mutual solubility or stable dispersion properties under sprayable pressure" and recommend dimethyl ether "from the point of view of mutual solubility and sufficient fluidity." In EP 0 616 018 B1, Nguyen recognizes the importance of ecologically sound propellant systems while allowing that the mixtures of propellants used should be compatible with the other components of the formulation, but focuses on compatibilization by hydrogenation of the SBS block. Here also, the distinction is made between the liquid and gaseous components of the propellant system and the value of each is briefly discussed. Purvis et al. (EP 1 160 179 A1) claim design parameters for aerosol cans while teaching that a combination of liquid and gas propellants involving "one or more components" is "a preferred embodiment."

BRIEF SUMMARY OF THE INVENTION

In one embodiment, the invention is a propellant blend for delivering an organic chemical-based material. The blend comprises: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material.

In another embodiment, the invention is a spray system comprising: a canister; an organic material to be sprayed, the organic material disposed within the canister; and, a propellant blend disposed within the canister. The propellant blend comprises: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material.

In another embodiment, the invention is a sprayable adhesive blend comprising: an adhesive composition; and a propellant blend disposed within the canister. The propellant blend comprises: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material.

In yet another embodiment, the invention is a method for delivering an organic material. the method comprises: charging the organic material into a canister; charging a propellant blend into the canister; allowing the propellant blend to develop an internal pressure in the canister that is greater than atmospheric pressure; and, discharging the organic material from the canister by means of the internal pressure developed by the propellant blend. The propellant blend comprises: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material.

DETAILED DESCRIPTION OF THE INVENTION

The term "propellant" shall herein refer to a mixture of one or more low boiling liquids and/or gases that is blended with an organic chemical-based "formulation" comprising at least one of solvent, water, surfactant, adhesive, food product, lubricant, insecticide, herbicide, cosmetic, paint, coating, ink, cleaning agent, foamed insulation, rust remover, personal care product or the like to comprise a "system" that can be sprayed using an airless canister or aerosol can. For the purposes of this document an "airless" spray system shall be distinguished from other spraying systems by not requiring a separate air line hookup.

Solubility, as used herein, refers to true solutions and miscible systems as well as stable dispersions or emulsions.

When combining formulations with a propellant, compatibility of the former with the latter must be considered. Compatibility is defined herein as the ability of two substances to form a time-stable intimate dispersion with each other, such as a solution, miscible gases, emulsions, and suspensions. Compatibility is generally related to the solubility or miscibility of the two substances in each other, although two otherwise incompatible substances can be "compatibilized" by means of surfactants or the like to form stable emulsions.

Compatibility is a well-known characteristic in the art and is determined by placing the substances into a thick-walled glass jar. The glass jar is then shaken to mix the substances with each other. The jar is then allowed to rest and the contents are observed for signs of separation, segregation, or settlement.

A reasonably good predictor of compatibility is the solubility parameter number. Two substances are considered to be marginally compatible, or marginally compatibilized, for the purposes of this invention if they exhibit no more separation or segregation than two non-compatibilized substances differing by about two solubility parameter numbers.

The propellant cannot be so incompatible as to be unstable or to be inadequate to aerosolize the formulation. Instability of the system results in a spray that is inhomogeneous in composition and that sputters badly. A propellant that is incompatible with the formulation gives an un-aerosolized stream that drips. Neither of these situations is acceptable to the end user.

On the other hand, if the propellant is too compatible with or too soluble in the formulation, over-aerosolization or foaming can result, leading to wasteful overspray. Increased solubility of the propellant can substantially reduce the propellant pressure, making it difficult to completely empty the canister. Neither of these situations is acceptable to the end user.

We have found that propellants consisting of a combination of: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material are effective for a wide range of airless applications. Adjustment of the ratios of (a) to (b) to (c) can lead to propellants that provide excellent spray patterns for a wide range of organic chemical-based formulations.

Component (a) may be added at a level of about 0.01 weight % to about 99.98 weight %, preferably 10.1 to 94.9 weight %, more preferably 30 to 94.9 weight %, most preferably about 65 to about 90 weight %, based on the total weight of propellant. Component (a) should be present in the amount of about 0.1 to about 25 weight % of the total formula (i.e., the propellant blend and the organic chemical-based material.

Component (a) is preferably a low-boiling point liquid. Dimethyl ether is one of the best liquid propellant candidates because it is very compatible with most organic chemical-based formulations. Propellants using various low molecular weight hydrocarbon isomer blends are somewhat less compatible with such formulations but are also widely used. Many fluorocarbons such as Dymel® 152A (1,1-difluoroethane) are not very compatible with these formulations but are used nonetheless. All three of these liquid propellants are flammable, which, in today's safety-conscious and tort-laden world, increasingly limits their use.

Dymel® 134A (1,1,1,2-tetrafluoroethane) is the only readily available, reasonable-cost liquid propellant that is nonflammable. It has the added advantage of being VOC exempt. However, it lacks good compatibility with most organic chemical-based formulations and cannot often be used as the only propellant component. Should the end-user or governmental safety and/or health regulations require a nonflammable, low VOC propellant system for a canister system, options are extremely limited. Given current trends in regulations dealing with insurability and air quality, the situation for manufacturers of canister-based products will only get worse.

Component (b) has a solubility, in the organic chemical-based material, of at least about 3 weight %, preferably 3-10 weight %, more preferably 3-6 weight %, based on the weight of the organic chemical-based material. Component (b) may be added at a level from about 0.01 to 99.98 weight %, preferably 5 to 79.9 weight %, more preferably about 5 to 65 weight %, and most preferably about 9 to about 35 weight %, based on the total weight of the propellant blend.

Component (b) is a slightly soluble gas. Carbon dioxide is at least slightly soluble in both water and in organic solvents (e.g., about 4.5 weight % solubility in methylene chloride) but dissolves relatively slowly, making the filling of canisters more time-consuming and tedious. In our tests, attempts to spray adhesive systems with a combination of Dymel® 134A and carbon dioxide lead to severe pulsing that causes an erratic fan-width of the spray pattern that is unacceptable to the end user.

Combinations of propellants have been used by those skilled in the art to overcome these difficulties. The low-boiling liquid component most often contributes compatibility and also renews and stabilizes pressure as the gas is removed during spraying. Moreover, the liquid form of the propellant is more efficient since it requires less volume than the comparable weight of gas. When the concentration of liquid propellant is kept low due to its limited solubility, then a compressed gas is sometimes used to effect a uniform spray pattern while dispensing. Consequently, a gas is used as the second component of the propellant to provide the necessary additional pressure.

Component (c) has a solubility, in the organic chemical-based material, of less than about 3 weight %, preferably about 0 to about 2 weight %, more preferably from about 0 to about 1.5 weight %, based on the weight of the organic chemical-based material. Component (c) is present at an amount from 0.01 to 99.98 weight %, preferably 0.1 to 10 weight %, more preferably 0.1 to 5 weight %, most preferably about 0.8 to about 3.8 weight %, based on the total weight of the propellant blend.

Nitrogen gas is commonly used to augment canister pressure but nitrogen is relatively inert and does not provide needed compatibility. Oxygen and $(NO)_x$ are more soluble in both water and in organic media but are likely to be reactive toward formulation components such as unsaturated rubbers and will reduce the canister system shelf life.

Surprisingly, when a nitrogen charge is added to the Dymel® 134A/carbon dioxide propellant blend, the pulsing disappears and the fan width stabilizes and becomes consistent. This discovery, as well as being unanticipated, is important because: 1) it provides a new propellant blend with the proper compatibility with organic chemical-based formulations for airless spraying systems, 2) the propellant blend is nonflammable, 3) the propellant blend has zero VOC and 4) it could lead to higher solids systems hitherto impossible that would reduce waste.

End users have benefited greatly from the advent of airless canisters and aerosol cans as formulation delivery systems. Unlike pressure pot systems, the canisters do not have to be cleaned after each use; the canister can simply be shut off for reuse at any time without cleaning. Likewise, there is no need for an air compressor. The inconvenience of extra hoses and the need for a power source are eliminated. Moreover, airless canisters are portable and can be used in remote locations, are compact and can be used in confined spaces and are lightweight and can be easily carried up and down ladders. From small aerosol cans to jumbo canisters for big jobs, airless systems provide convenience, portability and ease of operation that can save money by significantly cutting setup, application and cleanup time.

At the same time, governmental, shipping and environmental regulations have limited the growth of airless systems. It is more difficult to aerosolize airless systems than pressure pot systems simply because not as much pressure is available to the former. The Department of Transportation (DOT) sets a maximum allowable canister shipment pressure at 260 psi at 130° F. Higher pressures, if delivered to the spray gun tip, could better aerosolize the formulation. Insurance companies are becoming less willing to underwrite policies covering manufacturers who use and store flammables and are even less willing to do so if the flammables are under pressure. Of the major liquid propellants, only Dymel® 134A is nonflammable and it is not highly compatible with most organic chemical-based formulations.

Air Quality Management Districts (AQMD) that regulate allowable VOC limits for product lines are very popular in California and the concept is certain to spread to other states. For example, the AQMD regulations prohibit sale of adhesives within the district that have VOC levels above those set by the district. Such regulations apply to both solvents and propellants. Exempt solvents important for the adhesives industry are limited to methylene chloride, acetone, t-butyl acetate and methyl acetate. Furthermore, California has outlawed methylene chloride, one of the workhorse solvents for the nonflammable adhesives market. The only widely available, reasonably priced exempt propellants are Dymel® 134A and Dymel® 152A. The adhesives canister industry finds itself in a very small box if it is to conform with DOT regulations for pressure, provide a nonflammable product and limit VOC content. Moreover, airless systems will not provide a good spray pattern if the propellant system is not compatible with the adhesive formulation.

The amount of propellant added to the canister is easily determined by one skilled in the art. Preferably, the weight of propellant is minimized in order to conserve volume in the canister and to keep shipping weight down. Typically, propellants comprise between about 2 to about 40 weight % of the total contents of the canister.

The present invention in a preferred embodiment is a zero VOC, nonflammable propellant blend that is uniquely compatible with a wide variety of formulations and allows excellent aerosolization of said formulations producing spray patterns that are well fanned and consistent in airless systems. The preferred embodiment is a nonflammable, zero VOC propellant that consists of a mixture of: (a) a liquid propellant with marginal compatibility with an organic chemical-based formulation (such as Dymel® 134A), (b) a gaseous propellant with better compatibility with an organic chemical-based formulation (such as carbon dioxide) and (c) a gaseous propellant with marginal compatibility with an organic chemical-based formulation (such as nitrogen). Depending on the solvent used, the propellant can also result in canisters that are nonflammable according to the required DOT test method.

The scope of the invention is not limited to a combination of Dymel® 134A, carbon dioxide and nitrogen. The invention teaches that the proper combination of propellant ingredients of categories (a), (b) and (c), as defined in the preceding paragraph, can overcome the limitations of propellant solubility, compatibility, polarity, flammability and VOC content and give excellent sprayability for the end user.

While we offer the following mechanism to explain the present invention, we do not wish to be bound by theory. The theories are suggested throughout this disclosure to better understand the present invention but are not intended to limit the effective scope of the claims. It is known that Dymel® 134A and its fluorocarbon and hydrofluorocarbon analogs have limited solubility in many organic chemical-based formulations. It was believed that addition of carbon dioxide to the formulation would enhance sprayability because of carbon dioxide's higher solubility in organic media than many gases. As will be seen in the examples, this was not entirely the case. The propellant system comprising Dymel® 134A and carbon dioxide led to pulsing during spraying and variable fan width. While aerosolization was definitely improved, it is felt that the spray instability is due either to: 1) carbon dioxide being relatively slow in transitioning between solubility in the organic chemical-based formulation and presence in the headspace or 2) a cooling during spraying and increased solubility of headspace carbon dioxide in the formulation. Surprisingly, the addition of nitrogen gave a consistent spray pattern with constant fan width.

The inventive propellant blends are compatible with a wide variety of formulation polarity while permitting excellent spraying patterns in airless canisters and aerosol cans by altering the ratios of the propellant components. A system that is less polar than the generic formulation used in the examples below would require a less polar solvent, for example. It is possible that this system would be more compatible with the Dymel® 134A and would require less carbon dioxide for aerosolization and less nitrogen for stabilization. Conversely, a more polar formulation would likely require a different ratio of the three propellant components that tended to favor higher amounts of carbon dioxide and nitrogen.

While the preferred embodiments of the invented propellant consist of Dymel® 134A, carbon dioxide and nitrogen, variants are possible that use other hydrofluorocarbon or fluorocarbon liquid propellants, other more soluble gases and/or other more inert gases. Moreover, the invention is not limited to 3 components; extra components may be needed in order to obtain the proper compatibility between formulation and propellant systems. Whereas it is desirable for formulations to have low VOC and to be nonflammable, we do not intend, for the sake of this invention, to be limited by these restrictions in defining its utility.

We further believe that the scope of the invention does not limit it to adhesive applications in airless spray systems as set forth in the following examples. Other possible applications consist of, but are not limited to, food products, lubricants, insecticides, herbicides, cosmetics, paints, coatings, inks, cleaning agents, foamed insulation, rust removers, personal care products and the like.

The teachings herein apply equally to solvent-based and water-based systems. Solubility, compatibility and sprayability are important considerations in airless systems irrespective of the nature of the carrier solvent.

Multi-component propellant blends can likewise be useful for formulations comprised of emulsions, dispersions and suspensions. The same considerations of solubility and compatibility are as important for sprayability here as for truly soluble systems.

There is always an interest in formulations with higher solids—waste is reduced and fewer passes to coat the substrate with the required weight are needed. All other things being equal, higher solids make it more difficult to obtain an acceptable spray pattern in airless systems. The ability to dial in the proper propellant compatibility should permit the use of higher solids formulations in canisters and aerosol cans.

The invention may be used as a method to deliver an organic material. The method comprising: charging the organic material into a canister; charging a propellant blend into the canister, wherein the propellant blend comprises: (a) a liquid component that is soluble in the organic chemical-based material; (b) a soluble gas component that has a solubility of at least about 3% by weight in the organic chemical-based material; and, (c) a substantially insoluble gas component that has a solubility of less than about 3% by weight of the organic chemical-based material; allowing the propellant blend to develop an internal pressure in the canister that is greater than atmospheric pressure; and, discharging the organic material from the canister by means of the internal pressure developed by the propellant blend. Typically, the canister will be discharged through a spray nozzle.

The details and importance of the described invention will be made clear by the following non-limited examples. The adhesive formulation used in the examples consists of a generic mixture of a methylene chloride solvent, styrene isoprene triblock rubber, petroleum hydrocarbon resin and a stabilizer/antioxidant package.

EXAMPLE 1

Dymel® 134A Propellant Only

Into a glass pressure aerosol bottle are added successively X grams of the generic styrene isoprene adhesive formulation described above and Y grams of Dymel® 134A (1,1,1,2-tetrafluoroethane) as shown in Table I. Table I gives the formulation details, temperature stability and spraying characteristics. For Example 1A, the spray pattern is pebbly in all but a very narrow range of sprayer settings. The spray consists of a rather narrow fan with excessive tailing. Example 1B is not stable to cold. Neither of these formulations would be acceptable to the end user.

TABLE I

DYMEL ® 134A PROPELLANT ONLY

| EXAMPLE | X, grams | Y, grams | Stable, 25° C. | Stable, −20° C. | Spray Pattern |
|---|---|---|---|---|---|
| 1A | 78.6 | 13.9 | Yes | Yes | Bad |
| 1B | 78.6 | 20.9 | Yes | No | Good |

EXAMPLE 2

Dymel® 134A and Nitrogen Propellants

Into an 11-pound metal canister are added successively 4173 grams of the generic styrene isoprene adhesive formulation described above, 720 grams of Dymel® 134A (1,1,1,2-tetrafluoroethane) propellant and 35 grams of nitrogen. Table II gives the results of spraying and stability studies. Although the canister is stable at low temperatures, the spray pattern is pebbly except within a very narrow range of sprayer settings. The only change from EXAMPLE 1A is that the fan width has increased but without any reduction in tailing. This canister would not be acceptable for an end user.

TABLE II

DYMEL ® 134A AND NITROGEN PROPELLANTS

| EXAMPLE | Stable, 25° C. | Stable, −20° C. | Spray Pattern |
|---|---|---|---|
| 2A | Yes | Yes | Bad |

EXAMPLE 3

Dymel® 134A and Carbon Dioxide Propellants, Temperature Stability

Into a glass pressure aerosol bottle are added successively X grams of the generic styrene isoprene adhesive formulation described above, Y grams of Dymel® 134A propellant (1,1,1,2-tetrafluoroethane) and Z grams of carbon dioxide as shown in Table III. Table III gives the results of temperature stability studies at −20° C., 25° C. and 50° C. It is clear from this data and from data in EXAMPLE 1B that that this adhesive system is not stable in the presence of higher amounts of Dymel® 134A. This spray pattern would not be acceptable for an end user.

TABLE III

DYMEL® 134A AND CARBON DIOXIDE PROPELLANTS, TEMPERATURE STABILITY

| EXAMPLE | X, grams | Y, grams | Z, grams | Y/Z | Stable, −20° | Stable, 25° | Stable, 50° C. |
|---|---|---|---|---|---|---|---|
| 3A | 80 | 13.7 | 1.9 | 87.8/12.2 | Yes | Yes | Yes |
| 3B | 80 | 17.7 | 2.7 | 86.8/13.2 | No | Yes | — |
| 3C | 80 | 12.5 | 1.2 | 91.2/8.8 | Yes | Yes | — |
| 3D | 80 | 10.9 | 1.3 | 89.3/10.7 | Yes | Yes | — |

EXAMPLE 4

Dymel® 134A and Carbon Dioxide Propellants, Spray Pattern

Into an 11-pound metal canister are added successively 3801 grams of the generic styrene isoprene adhesive formulation described above, 681 grams of Dymel® 134A (1,1,1,2-tetrafluoroethane) propellant and 133 grams of carbon dioxide. Although the formulation was stable, the spray pattern pulsed severely, which caused an erratic fan-width. Pulsing would be unacceptable to the end user.

EXAMPLE 5

Dymel® 134A, Carbon Dioxide and Nitrogen Propellants

Into an 11-pound metal canister are added successively X grams of the generic styrene isoprene adhesive formulation described above, Y grams of Dymel® 134A (1,1,1,2-tetrafluoroethane) propellant, Z grams of carbon dioxide and W grams of nitrogen as shown in Table IV. All formulations were stable at −20° C. and 25° C. Table IV gives the results of spraying studies. The pulsing spray pattern disappears within a wide range of carbon dioxide/nitrogen ratios. The process is robust and these results would be acceptable for the end user.

TABLE IV

DYMEL® 134A, CARBON DIOXIDE AND NITROGEN PROPELLANTS

| EXAMPLE | X, grams | Y, grams | Z, grams | W, grams | Z/W | Spray Pattern |
|---|---|---|---|---|---|---|
| 5A | 3884 | 686 | 78 | 30 | 2.6/1 | Good |
| 5B | 3840 | 678 | 152 | 25 | 6.1/1 | Good |
| 5C | 3809 | 672 | 201 | 25 | 8.0/1 | Good |
| 5D | 3917 | 691 | 274 | 16 | 17.1/1 | Good |
| 5E | 3786 | 668 | 348 | 8 | 43.5/1 | Bad |

What is claimed is:

1. A composition being at a pressure greater than atmospheric pressure, the composition comprising:
   an adhesive; and
   a propellant blend comprising:
   (a) 1,1,1,2-tetrafluoroethane;
   (b) carbon dioxide gas; and,
   (c) nitrogen gas;
   wherein the carbon dioxide gas is present in an amount from about 28 weight percent to about 9 weight percent and the nitrogen gas is present in an amount from about 1.6 to about 4 weight percent, based on the weight of the propellant blend.

2. The composition of claim 1 wherein the 1,1,1,2-tetrafluoroethane is present in an amount of from about 10.1 weight % to about 90 weight %, based on the total weight of the propellant blend.

3. The composition of claim 2 wherein the 1,1,1,2-tetrafluoroethane is present in an amount of from about 30 weight % to about 90 weight %, based on the total weight of the propellant blend.

4. The composition of claim 3 wherein the 1,1,1,2-tetrafluoroethane is present in an amount of from about 65 weight % to about 90 weight %, based on the total weight of the propellant blend.

5. The composition of claim 1, wherein the 1,1,1,2-tetrafluoroethane is present in an amount of from about 0.1 to about 25 weight %, based on the combined weight of the propellant blend and the adhesive.

6. The composition of claim 1, wherein the carbon dioxide gas has a solubility of from about 3 to about 10 weight %, based on the weight of the adhesive, at the pressure of the composition.

7. The composition of claim 1, wherein the 1,1,1,2-tetrafluoroethane has a solubility of from about 3 to about 6 weight %, based on the weight of the adhesive, at the temperature and pressure of the composition.

8. The composition of claim 1, wherein the nitrogen gas has a solubility of from about 0 to about 2 weight %, based on the weight of the adhesive, at the pressure of the composition.

9. The composition of claim 1, wherein the nitrogen gas has a solubility of from about 0 to about 1.5 weight %, based on the weight of the adhesive, at the pressure of the composition.

10. A spray system comprising:
    a canister;
    an adhesive to be sprayed, the adhesive disposed within the canister; and,
    a propellant blend disposed within the canister, the blend comprising:
    (a) 1,1,1,2-tetrafluoroethane;
    (b) carbon dioxide gas; and,
    (c) nitrogen gas, wherein the carbon dioxide gas is present in an amount from about 28 weight percent to about 9 weight percent and the nitrogen gas is present in an amount from about 1.6 to about 4 weight percent, based on the weight of the propellant blend.

11. The spray system of claim 10, wherein the 1,1,1,2-tetrafluoroethane is present in an amount of from about 0.1 to about 25 weight %, based on the combined weight of the propellant blend and the adhesive.

12. The spray system of claim 10, wherein the carbon dioxide gas has a solubility of from about 3 to about 10 weight %, based on the weight of the adhesive.

13. The spray system of claim 10, wherein the carbon dioxide gas has a solubility of from about 3 to about 6 weight %, based on the weight of the adhesive.

14. The spray system of claim 10, wherein the nitrogen gas has a solubility of from about 0 to about 2 weight %, based on the weight of the adhesive.

15. The spray system of claim 10, wherein the nitrogen gas has a solubility of from about 0 to about 1.5 weight %, based on the weight of the adhesive.

16. A method for delivering an adhesive, the method comprising:

charging the adhesive into a canister;

charging a propellant blend into the canister, wherein the propellant blend comprises:
(a) 1,1,1,2-tetrafluoroethane;
(b) carbon dioxide gas; and,
(c) nitrogen gas, wherein the carbon dioxide gas is present in an amount from about 28 weight percent to about 9 weight percent and the nitrogen gas is present in an amount from about 1.6 to about 4 weight percent, based on the weight of the propellant blend;

allowing the propellant blend to develop an internal pressure in the canister that is greater than atmospheric pressure; and, discharging the adhesive from the canister by means of the internal pressure developed by the propellant blend.

17. The method of claim 16, wherein the adhesive is discharged from the canister through a spray nozzle.

18. The method of claim 16, wherein the 1,1,1,2-tetrafluoroethane is present in an amount of from about 0.1 to about 25 weight %, based on the combined weight of the propellant blend and the adhesive.

19. The method of claim 16, wherein the carbon dioxide gas has a solubility of from about 3 to about 10 weight %, based on the weight of the adhesive.

20. The method of claim 16, wherein the carbon dioxide gas has a solubility of from about 3 to about 6 weight %, based on the weight of the adhesive.

21. The method of claim 16, wherein the nitrogen gas has a solubility of from about 0 to about 2 weight %, based on the weight of the adhesive.

22. The method of claim 16, wherein the nitrogen has a solubility of from about 0 to about 1.5 weight %, based on the weight of the adhesive.

* * * * *